United States Patent [19]

Yamazaki et al.

[11] Patent Number: 5,894,361
[45] Date of Patent: Apr. 13, 1999

[54] STEREOSCOPIC LIQUID CRYSTAL DISPLAY HAVING DIFFERENT ORIENTATION DOMAINS

[75] Inventors: Shunpei Yamazaki, Tokyo; Yoshiharu Hirakata, Kanagawa; Satoshi Teramoto, Kanagawa; Jun Koyama, Kanagawa, all of Japan

[73] Assignee: Semiconductor Energy Laboratory Co., Ltd., Kanagawa-ken, Japan

[21] Appl. No.: 08/720,716

[22] Filed: Oct. 2, 1996

[30] Foreign Application Priority Data

Oct. 15, 1995 [JP] Japan .................................. 7-293743

[51] Int. Cl.⁶ .................. G02F 1/1335; G02F 1/1347; G02F 1/1337
[52] U.S. Cl. .................. 349/15; 349/129; 349/76; 349/96
[58] Field of Search .................. 349/15, 128, 129, 349/76, 74, 75, 96; 359/22, 23, 465

[56] References Cited

U.S. PATENT DOCUMENTS

| | | | |
|---|---|---|---|
| 4,957,351 | 9/1990 | Shioji | 349/15 |
| 5,113,285 | 5/1992 | Franklin et al. | 359/465 |
| 5,280,375 | 1/1994 | Tsuda et al. | 349/129 |
| 5,303,076 | 4/1994 | Okada et al. | 349/129 |
| 5,629,798 | 5/1997 | Gaudreau | 359/465 |
| 5,686,975 | 11/1997 | Lipton | 349/15 |

FOREIGN PATENT DOCUMENTS

| | | | |
|---|---|---|---|
| 61-137128 | 6/1986 | Japan | 349/465 |
| 61-137129 | 6/1986 | Japan | 349/15 |
| 63-274919 | 11/1988 | Japan | 349/15 |

*Primary Examiner*—Hung Xuan Dang
*Assistant Examiner*—Tiep H. Nguyen
*Attorney, Agent, or Firm*—Fish & Richardson P.C.

[57] ABSTRACT

A display unit which allows stereoscopic images to be displayed on a direct-vision liquid crystal panel is provided. The display unit has the formation in which liquid crystal is sandwiched in a gap between a pair of glass substrates. When linearly polarized lights whose polarizing directions are differentiated by 90° from each other by a π cell are input alternately to the liquid crystal, images to be displayed turn out as two images whose polarizing directions differ by 90° from each other and which are displayed in a time-division manner. The images may be perceived as a stereoscopic image by viewing them by glasses having polarizing directions different by 90° for right and left eyes.

19 Claims, 4 Drawing Sheets

STEREOSCOPIC LIQUID CRYSTAL DISPLAY HAVING DIFFERENT ORIENTATION DOMAINS

BACKGROUND OF THE INVENTION

The present invention relates to the formation of a direct-vision type liquid crystal display unit.

DESCRIPTION OF RELATED ART

As a method for displaying stereoscopic images, a technology of supplying images specifically to right and left eyes has been known since the past ("Basics of Three-Dimensional Pictures" edited by NHK Science and Technical Research Laboratories under the supervision of Takehiro Izumi, Published by Ohm Sha, Ltd.).

In concrete, there have been known a method of projecting an image for right eye and that for left eye by superposing each other on the same screen by using two projectors and of viewing them separately by right and left eyes by using special filters, and a formation adapted to enable to view different images by right and left eyes by using lenticular lenses.

However, such formations have had a problem that they require two images to be formed respectively by different image forming means, e.g. liquid crystal projectors, thus increasing the complexity and size of the whole formation.

Accordingly, it is an object of the present invention to provide a formation which enables to display stereoscopic images on a direct-vision type liquid crystal panel.

SUMMARY OF THE INVENTION

One of the inventions of a display unit disclosed in the present specification is characterized in that it has domains of pixels disposed in a matrix and a liquid crystal layer to which orientations are given by diving the pixel domains into two groups; and that a first image is formed in one group of the oriented domains of the liquid crystal layer and a second image is formed in the other group of the oriented domains of the liquid crystal layer.

FIG. 1 shows a concrete example of the display unit constructed as described above. In the formation shown in FIG. 1, different orientations as shown by arrows are given to odd rows of the domains of pixels disposed in a matrix (indicated typically by reference numerals 105 and 106) and to even rows (indicated typically by reference numerals 107 and 108). The orientations of the liquid crystal provided in a gap 103 are given in accordance to these orientations Then, the first image is formed in the domains composed of the odd rows described above and the second image is formed in the domains composed of the even rows.

The formation of a display unit according to another invention is characterized in that it has a liquid crystal layer in which different orientations are given in stripes and that a first image is formed in odd domains of the striped domains; and a second image is formed in even domains of the striped domains.

The formation of a display unit according to a still other invention is characterized in that it has a pair of translucent substrates; liquid crystal sandwiched between the translucent substrates; and orientation giving means disposed on the pair of substrates on the side of the surface which contacts with the liquid crystal; and that domains having a first orientation and domains having a second orientation, whose direction of orientations are different by 90° or approximately 90° from each other, are formed on the liquid crystal by the orientation giving means; the domains having the first orientation and the domains having the second orientation are disposed in stripes; a first image is formed in the domains having the first orientation among the domains of the liquid crystal to which the different orientations are given in stripes; and a second image is formed in the domains having the second orientation among the domains of the liquid crystal to which the different orientations are given in stripes.

In the liquid crystal panel constructed as described above, the liquid crystal is put into a state in which the orientations differ by 90° from each other per one line or per a plurality of lines forming an image to input linearly polarized lights which conform to the respective orientations in a time division manner.

Then, image lights having polarizing directions which differ by 90° from each other are time-divided and displayed on the liquid crystal panel. The images may be viewed by right and left eyes separately by viewing them through glasses provided with polarizing filters having polarizing directions which differ by 90° for the right and left eyes.

A stereoscopic image may be obtained by appropriating the images optically modulated by the liquid crystal layer having the respective orientations as the image for the right eye and that for the left eye.

The above and other features and advantages of the present invention will become more apparent in the following description and the accompanying drawings in which like numeral refer to like parts.

DESCRIPTION OF PREFERRED EMBODIMENTS

First Embodiment

Figure 1:
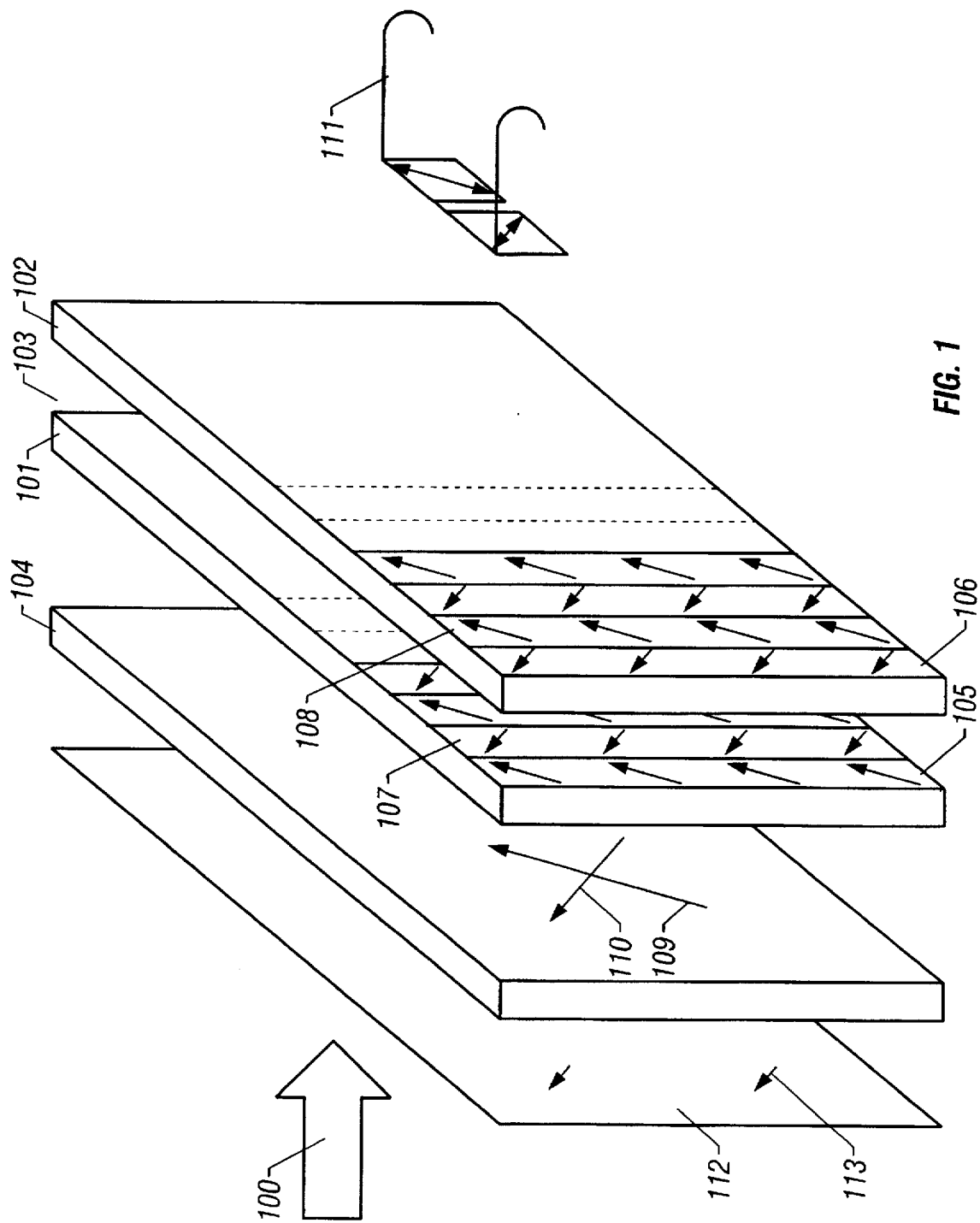
FIG. 1 is a drawing showing a schematic formation of an inventive display unit.

FIG. 1 shows a schematic formation of a direct-vision liquid crystal panel of one embodiment of the present invention. In the formation shown in the figure, white light 100 from a light source enters to a polarizing plate 112 at first. This polarizing plate has a polarizing direction indicated by an arrow 113. Accordingly, the light which has transmitted through the polarizing plate 112 becomes once which has been polarized linearly in the direction indicated by the arrow 113.

The light which has transmitted through the polarizing plate 112 enters to a π cell 104. The π cell is what utilizes TN type liquid crystal and has a function of changing the polarizing direction by 90°. Here, two linear polarization states indicated by arrows 109 and 110 can be selected by turning ON/OFF the π cell 104.

Here, the π cell is set so that light having the polarization indicated by the arrow 109 transmits through the π cell when the π cell is ON and light having the polarization indicated by the arrow 110 transmits through the π cell when the π cell is OFF.

The reference numerals 101 and 102 denote a pair of glass substrates composing the liquid crystal panel and liquid crystal is filled in a gap 103 thereof. Disposed on the inner surface of the substrates 101 and 102 are orientation films on which linear orientations each of which corresponds to one row of pixels are applied as indicated by the reference numerals 105 and 107 and 106 and 108. The orientations are given in the directions indicated by arrows in the figure.

The liquid crystal cell composed of the substrates 101 and 102 is different from an ordinary liquid crystal cell in that no polarizing filter is disposed and that the orientation given to the liquid crystal is striped.

First, odd rows of the domains 105 of pixels are masked with a resist, and the exposed domains 107 of pixels at even rows are subjected to rubbing treatment in a first direction, then the resist is removed and the even rows of the domains 107 of pixels are masked with another resist, and the exposed domains 105 of pixels at odd rows are subjected to rubbing treatment in a second direction vertical to the first direction, thus forming the first substrate 101. The second substrate 102 is also formed in a similar manner to the above.

An image optically modulated by the liquid crystal cell composed of the substrates 101 and 102 is viewed by special glasses 111. The glasses 111 are constructed so as to have different polarizing directions for right and left eyes.

In operating the display unit shown in FIG. 1, an image for the left eye is formed in the domains composed of sets of the striped domains 105 and 106 and an image for right eye is formed by the domains composed of sets of striped domains 107 and 108. These images are formed alternately with a predetermined timing.

Figure 2:
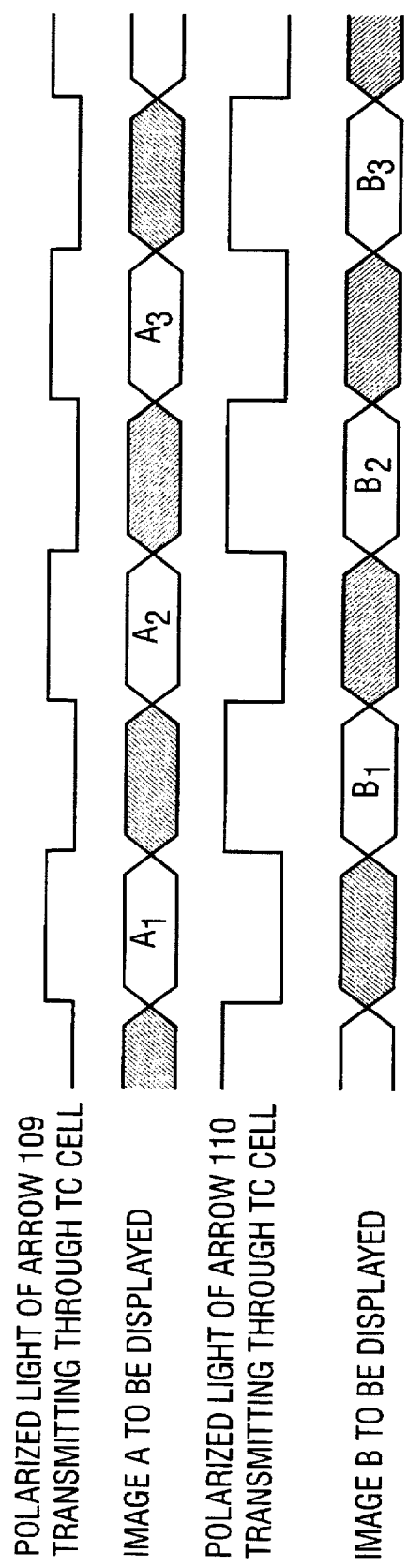
FIG. 2 is a chart showing operation timings of the display unit schematically.

FIG. 2 shows actions of the $\pi$ cell and timings for displaying two images. An image A in FIG. 2 is the image optically modulated when it transmits through the domains 105 and 106 in FIG. 1. An image B is the image optically modulated when it transmits through the domains 107 and 108 in FIG. 1.

The images A and B are displayed alternately by alternately turning ON and OFF the $\pi$ cell repeatedly as shown in FIG. 2. Switching of the display is carried out with a speed of 60 times or 120 times per second.

Then, it becomes possible to create a state as if the images A and B are displayed in the same time by displaying them in a time division manner by setting the width of the striped domains 105 and 107 and others to be equal to one pixel or to be fully thin.

When these images are viewed by the glasses 111, the images A and B can be seen separately by the left and right eyes. That is, the image A formed in the domains of the sets of the striped domains 105 and 106 can be seen by the left eye and the image B formed in the domains of the set of the striped domains 107 and 108 can be seen by the right eye. The images A and B can be seen separately because their polarizing directions are different by 90°.

Thus, the present embodiment allows stereoscopic images to be displayed even though its formation is simple.

Second Embodiment

Figure 3:
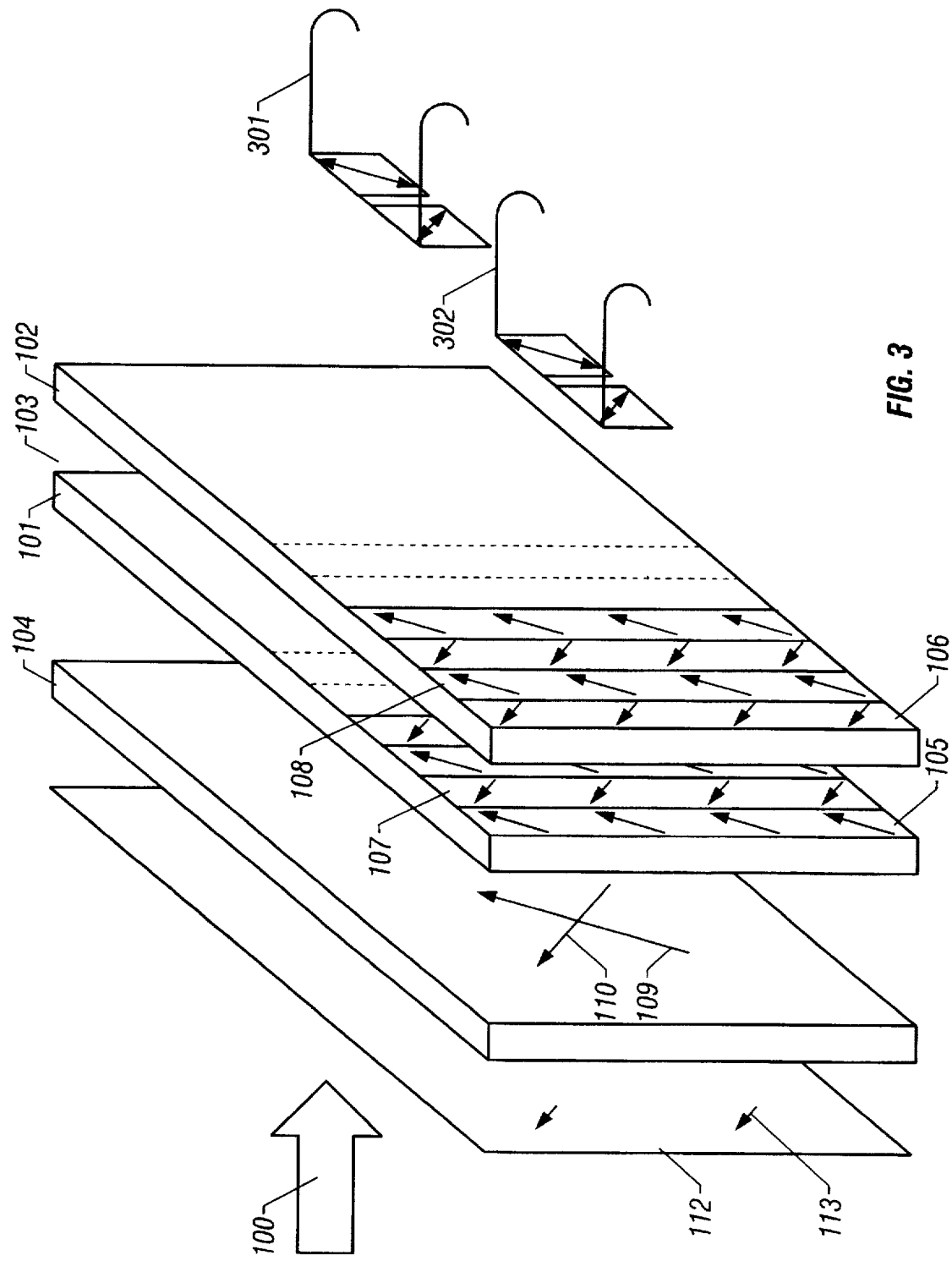
FIG. 3 is a drawing showing another schematic formation of an inventive display unit.

The present embodiment relates to a formation of a display unit for providing different images to two observers, respectively. FIG. 3 shows the schematic formation of the present embodiment.

The formation of the display unit is the same with that shown in FIG. 1. Accordingly, the formation shown in FIG. 1 may be utilized as it is for the formation of the present embodiment.

In the formation shown in FIG. 3, the observers view the display unit with glasses 301 and 302 on, respectively. Consider here that the images A and B shown in FIG. 2 are different from each other. Then, it becomes possible to create a state in which the observer with the glasses 301 on can see the image B and the observer with the glasses 302 on can see the image A, respectively.

Third Embodiment

The present embodiment relates to a formation of a display unit in which a quarter wavelength plate is disposed further on the display side of the substrate 102. Such formation can change the images A and B in FIG. 2 into circularly polarized lights whose turning directions are different from each other.

In this case, preferably, filters for selectively transmitting the right turn circularly polarized light and the left turn circularly polarized light are disposed on the part of the glasses 111 or 301 and 302 in the formation shown in the first embodiment or second embodiment.

Fourth Embodiment

Figure 4:
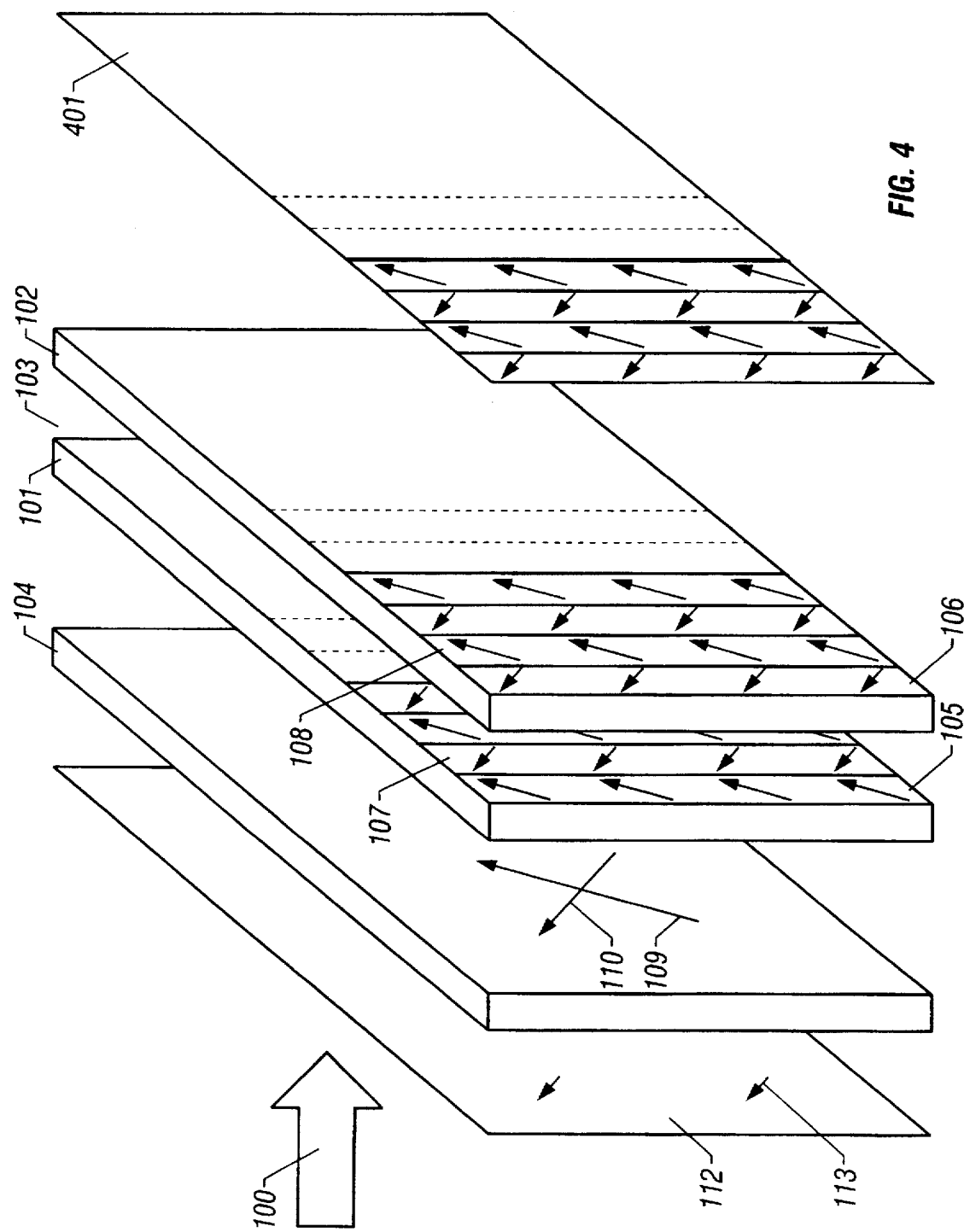
FIG. 4 is a drawing showing a still other schematic formation of an inventive display unit.

The present embodiment is characterized in that a polarizing filter having tile striped polarizing directions as indicated by the reference numerals 106 and 108 is additionally disposed in the formation shown in FIG. 1. FIG. 4 shows a schematic formation of the present embodiment. In the figure, the reference numeral 401 denotes the polarizing plate having the striped polarizing directions.

By constructing as described above, the formation shown in the first and second embodiments can be realized and in the same time, an ordinary image as displayed on an ordinary display may be seen when it is seen in the ordinary manner without using the special glasses.

Assume that the images A and B are the same one in the formation shown in the first embodiment for example. Then, the same screen is displayed in the time division manner and the ordinary image can be seen when it is seen without the special glasses on.

It is noted that when images are seen in the ordinary manner in the formation shown in FIG. 1, the difference of changes of the polarizing states caused by the liquid crystal provided in the gap 103 cannot be perceived by naked eyes, so that the display caused by transmission/non-transmission of light cannot be perceived.

The use of the invention disclosed in the present specification allows stereoscopic images to be displayed on the direct-vision liquid crystal panel with the simple formation. Further, the present invention allows the formation which allows a plurality of observers to see independent images, respectively, to be realized. Still more, because the present invention allows ordinary images to be displayed, it can be widely used.

While preferred embodiments have been described, variations thereto will occur to those skilled in the art within the scope of the inventive concepts which are delineated by the following claims.

What is claimed is:

1. A display unit comprising:

domains of pixels disposed in a matrix; and an electro-optical modulating layer to which orientations are given by dividing said pixel domains into two groups, wherein a first image is formed in one of the groups, and a second image is formed in another of the groups, and said orientations are different between said one of the groups and said another of the groups.

2. The unit of claim 1 wherein said electro-optical modulating layer comprises a liquid crystal.

3. The unit of claim 1 further comprising means for inputting linearly polarized lights whose orientations differ by 90° or approximately 90° from each other to said electro-optical modulating layer in a time division manner.

4. The unit of claim 1 wherein a stereoscopic image is formed by using the first and second images.

5. A display unit comprising:

an electro-optical modulating layer having stripe form domains, wherein a first image is formed in odd domains of said stripe form domains, and a second image is formed in even domains of said stripe form domains, and orientation of said odd domains is different from that of said even domains.

6. The unit of claim 5 wherein said electro-optical modulating layer comprises a liquid crystal.

7. The unit of claim 5 wherein a stereoscopic image is formed by using the first and second images.

8. A display unit comprising:

a pair of translucent substrates;

an electro-optical modulating layer provided between said translucent substrates; and orientation giving means disposed on said pair of substrates on a side of a face thereof in contact with the electro-optical modulating layer, wherein domains having a first orientation and domains having a second orientation, whose directions of orientations are different by 90° or approximately 90° from each other, are formed in said electro-optical modulating layer by said orientation giving means, said domains having the first orientation and said domains having the second orientation are disposed in stripes, a first image is formed in the domains having the first orientation among the domains of said electro-optical modulating layer to which the different orientations are given in stripes; and a second image is formed in the domains having the second orientation among the domains of said electro-optical modulating layer to which the different orientations are given in stripes.

9. The unit of claim 8 wherein said electro-optical modulating layer comprises a liquid crystal.

10. The unit of claim 8 further comprising means for inputting linearly polarized lights whose orientations differ by 90° or approximately 90° from each other to said electro-optical modulating layer in a time division manner.

11. The unit of claim 8 wherein a stereoscopic image is formed by using the first and second images.

12. A display unit comprising:

domains of pixels disposed in a matrix;

an electro-optical modulating layer to which orientations are given by dividing said pixel domains into two groups, and means for inputting linearly polarized lights whose orientations differ by 90° from each other to said electro-optical modulating layer in a time division manner, wherein a first image is formed in one of the groups, and a second image is formed in another of the groups.

13. A display unit comprising:

an electro-optical modulating layer having domains which are in a stripe form, and means for inputting linearly polarized lights whose orientations differ approximately 90° from each other to said electro-optical modulating layer in a time division manner, wherein a first image is formed in odd domains of said stripe form domains, and a second image is formed in even domains of said stripe form domains, and an orientation of said odd domains is different from that of said even domains.

14. A display unit comprising:

domains of pixels disposed in a matrix; and an electro-optical modulating layer to which orientations are given by dividing said pixel domains into two groups, first and second polarizing filters having a structure enabling said filters to be worn, said first and second polarizing filters respectively having different polarizing directions from each other;

wherein a first image is formed in one of the groups whose domains are subjected to a rubbing treatment in a first direction, and a second image is formed in another of the groups whose domains are subjected to a rubbing treatment in a second direction, and said first direction is different from said second direction.

15. The unit of claim 14 wherein said different polarizing directions differ by approximately 90° for right and left eyes.

16. The unit of claim 14 wherein said pair of polarizing filters are formed in the form of glasses.

17. A display unit comprising:

an electro-optical modulating layer having domains which are in a stripe form, and first and second polarizing filters having a structure enabling said filters to be worn, said first and second polarizing filters respectively having different polarizing directions from each other;

wherein a first image is formed in odd domains of said stripe form domains, and a second image is formed in even domains of said stripe form domains, said even domains are subjected to a rubbing treatment in a first direction and said odd domains are subjected to a rubbing treatment in a second direction, and said first direction is different from said second direction.

18. The unit of claim 17 wherein said different polarizing directions differ by approximately 90° for right and left eyes.

19. The unit of claim 17 wherein said pair of polarizing filters are formed in the form of glasses.

* * * * *